United States Patent

DiRisio et al.

[11] Patent Number: 5,870,640
[45] Date of Patent: Feb. 9, 1999

[54] LEVER COCKING APPARATUS

[75] Inventors: Anthony DiRisio; Leonard Richiuso; Shannon A. Young, all of Rochester, N.Y.

[73] Assignee: Eastman Kodak Company, Rochester, N.Y.

[21] Appl. No.: 992,855

[22] Filed: Dec. 18, 1997

[51] Int. Cl.[6] .............................. G03B 17/42; G03B 9/00
[52] U.S. Cl. .................... 396/401; 396/411; 396/443
[58] Field of Search .................................. 396/401, 402, 396/411, 443, 444

[56] References Cited

U.S. PATENT DOCUMENTS

| | | | |
|---|---|---|---|
| 4,193,678 | 3/1980 | Son | 396/401 |
| 4,322,152 | 3/1982 | Satoh et al. | 396/502 |
| 5,005,034 | 4/1991 | Chan | 396/401 |
| 5,025,277 | 6/1991 | Inoue et al. | 396/411 |
| 5,446,513 | 8/1995 | Sato | 396/401 |
| 5,555,053 | 9/1996 | Stephenson | 396/399 |

*Primary Examiner*—Eddie C. Lee
*Attorney, Agent, or Firm*—Susan L. Parulski

[57] ABSTRACT

A cocking apparatus for moving a lever between a cocked position and a rest position. In a camera, the lever may be used to momentarily move a shutter member away from a lens opening of a camera. The cocking apparatus includes a drive gear, a driven gear having a contact surface for cooperation with the lever, and a resilient member biasing the lever in the rest position. The driven gear is biased in a first position wherein the drive gear and driven gear define a plane. A tooth portion of the driven gear, meshable with gear teeth of the drive gear when the drive gear and driven gear define the plane, effects pivoting of the lever from the rest position to the cocked position. A cam surface disposed on the driven gear translates the driven gear along its rotational axis to space the driven gear from the drive gear when the lever moves from the cocked position to the rest position.

15 Claims, 6 Drawing Sheets

LEVER COCKING APPARATUS

FIELD OF THE INVENTION

The present invention relates generally to the field of photography. More particularly, the present invention relates to a camera apparatus for cocking a lever, which operates a shutter.

BACKGROUND OF THE INVENTION

In the operation of a camera, a shutter is opened to permit exposure of the photographic film. To operate a shutter, a lever is typically employed to activate the shutter. U.S. Pat. No. 5,005,034 provides a camera mechanism in which a shutter plate operating member is mounted for movement between a cocked position and a rest position. When a button is pressed, the lever is released from the cocked position to activate the shutter.

It is desirable to have a lever cocking apparatus which is simple in design, reliable, provides for a reduction of the number of mechanical components required within a camera, does not damage the filmstrip, and provides quiet operation. Such a lever cocking apparatus should cycle between a cocking and rest position for each film frame advance, independent on the length of film which has been previously advanced.

Accordingly, a need continues to exist for a lever cocking apparatus which is simple in design, reliable, provides for a reduction of the number of mechanical components required within a camera, and provides quiet operation. Such a lever cocking apparatus should cycle between a cocking and rest position for each film frame advance, independent on the length of film which has been previously advanced.

SUMMARY OF THE INVENTION

An object of the present invention is to provide a lever cocking apparatus for activating a shutter.

Another object of the invention is to provide such a lever cocking apparatus which cycles between a cocking and rest position for each film frame advance, independent on the length of film which has been previously advanced.

Still another object of the invention is to provide such a lever cocking apparatus which is simple in design, reliable, provides for a reduction in the number of mechanical components required within a camera, and provides quiet operation.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an apparatus for cocking a lever in synchronization with film movement The apparatus includes a first and second gear. The second gear includes a contact surface which cooperates with the lever. The first gear is rotatable about a first axis and has gear teeth, while the second gear is rotatable about a second axis substantially parallel to the first axis and includes a toothed portion and a non-toothed portion. A resilient member biases the second gear in a first position wherein the toothed portion is meshable with the gear teeth of the first gear. A cam surface disposed on the second gear is adapted to translate the second gear along the second axis to a second position where the first and second gear are in spaced relation.

The present invention provides a lever cocking apparatus which is simple in design, reliable, permits a reduction of the number of mechanical components required within a camera, and provides quiet operation. Further, the lever cocking apparatus of the present invention cycles between a cocking and rest position for each film frame advance, independent on the length of film which has been previously advanced. In addition, the lever cocking apparatus is not cocked by the movement of the filmstrip, so no load is applied to the filmstrip which could result in damage to the filmstrip.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
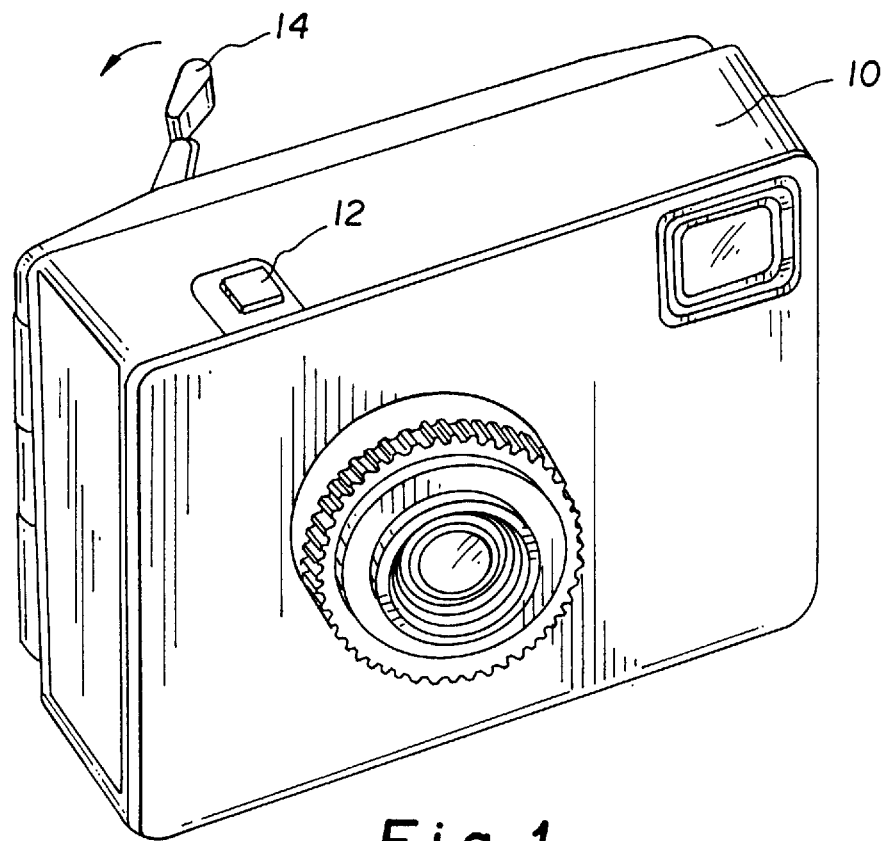
FIG. 1 shows a perspective view of a photographic camera.

The following is a detailed description of the preferred embodiments of the invention, reference being made to the drawings in which the same reference numerals identify the same elements of structure in each of the several figures.

A camera housing 10 is generally illustrated in FIG. 1, including a shutter button 12 and a member 14 for advancing the film.

The present invention is directed to a lever cocking apparatus generally illustrated in FIG. 2 wherein a high energy lever 16, hereinafter lever 16, is actuated, typically by the depression of shutter button 12, to activate a shutter in a camera to permit exposure of a film frame. Lever cocking apparatus includes lever 16 biased by a first resilient member 18, a drive gear 20, a driven gear 22 having a cam 24, a cam follower 26 stationarily mounted on camera housing 10, and a second resilient member 28.

Lever 16 rotates about an axis A, and moves between a rest or uncocked position and a cocked position. First resilient member 18 biases lever 16 in the uncocked position shown in FIGS. 3(a) and 3(b). FIGS. 4(a) and 4(b) show lever 16 in the cocked position. Lever 16 includes a latch surface 30, a cocking surface 32, and an activation surface 34.

Drive gear 20 is rotatable about an axis B by a driver, such as a motor 36. Drive gear 20 includes gear teeth.

Figure 6:
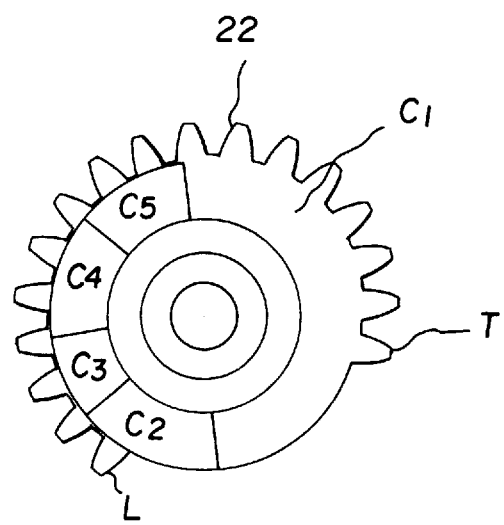
FIG. 6 shows a top view of the driven gear illustrated in FIG. 7.
Figure 2:
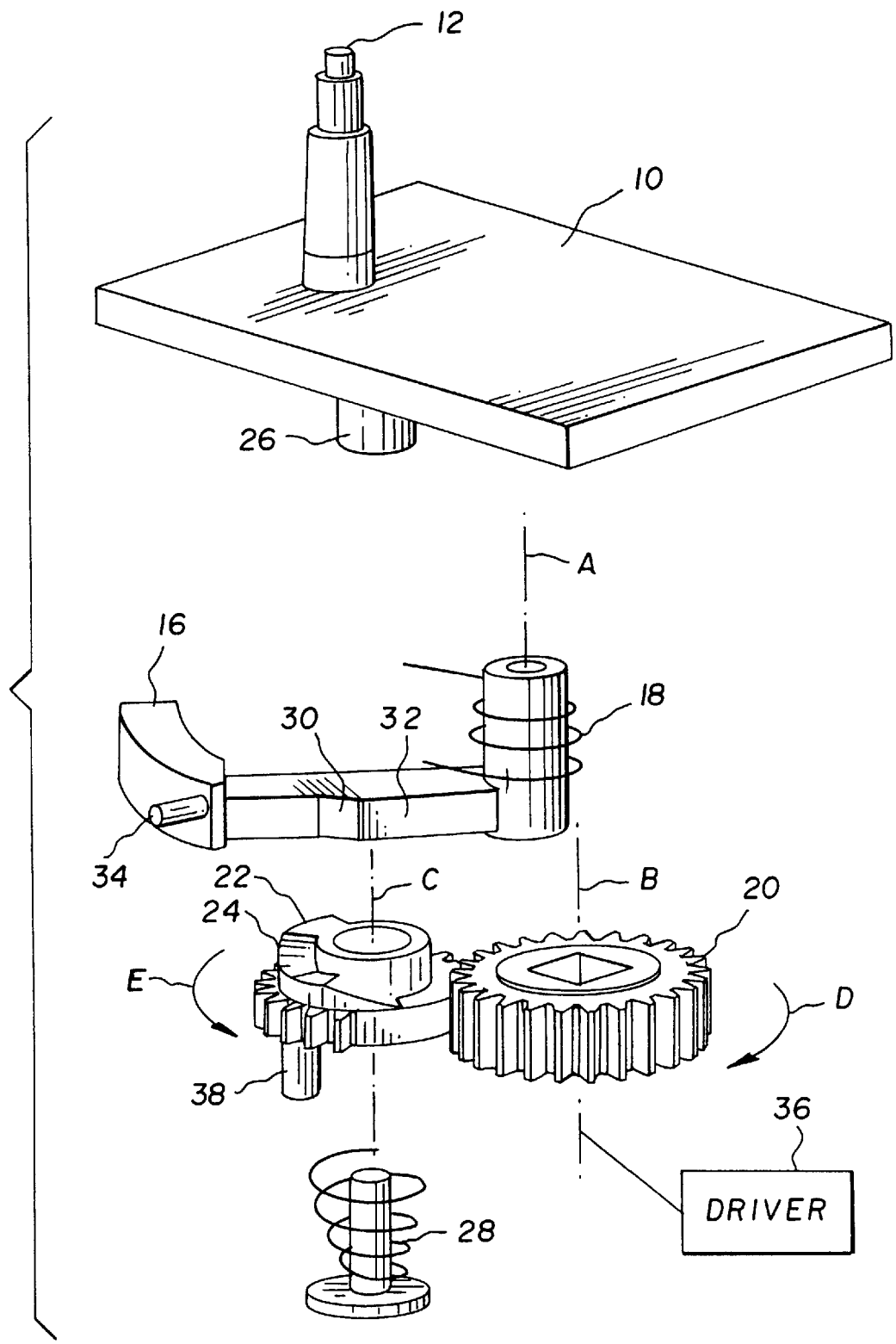
FIG. 2 shows an exploded perspective view of the components of a lever cocking apparatus in accordance with the present invention.
Figure 5:
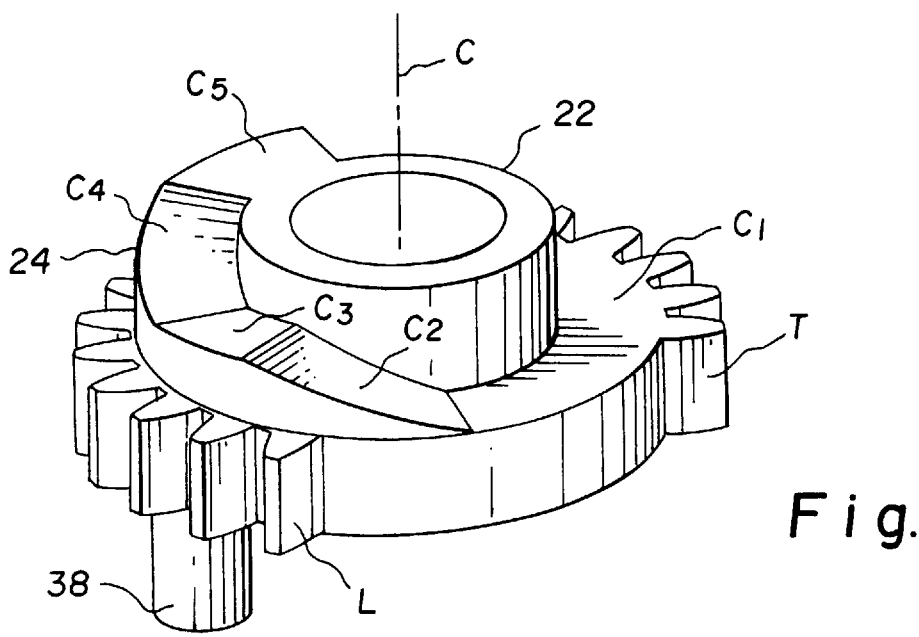
FIG. 5 shows a perspective view of the driven gear in accordance with the present invention.
Figure 10:
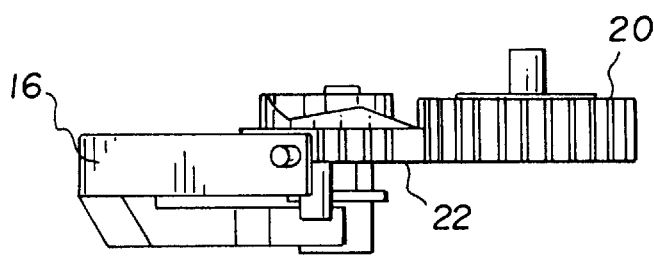
FIG. 10 shows a front view of the lever cocking apparatus illustrated in FIG. 7 with the lever in the ready position.
Figure 11:
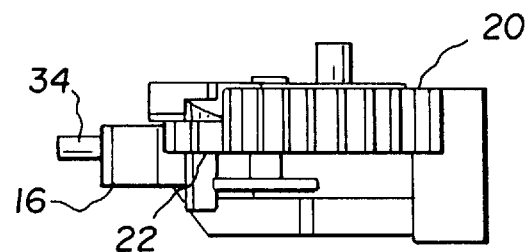
FIG. 11 shows a right side view of the lever cocking apparatus illustrated in FIG. 7 with the lever in the ready position.

Referring now to FIGS. 2, 5 and 6, driven gear 22 is rotatable about an axis C substantially parallel to axis B of drive gear 20. Driven gear 22 includes a contact surface 38 adapted to cooperate with latch surface 30 on lever 16. As illustrated in FIGS. 2 and 5, contact surface 38 is shown as a pin. Driven gear 22 includes a non-tooth portion and a tooth portion adapted to mesh with the gear teeth of drive gear 20. Driven gear 22 further includes cam 24 having a cam surface. As illustrated, the cam surface includes five segments $C_1$, $C_2$, $C_3$, $C_4$, $C_5$. Cam cooperates with cam follower 26 to translate driven gear 22 along axis C from a first position wherein the tooth portion is meshable with the gear teeth of drive gear 20 to a second position wherein driven gear 22 is spaced from drive gear 20. Second resilient member 28 biases driven gear 22 in the first position.

Figure 3A:
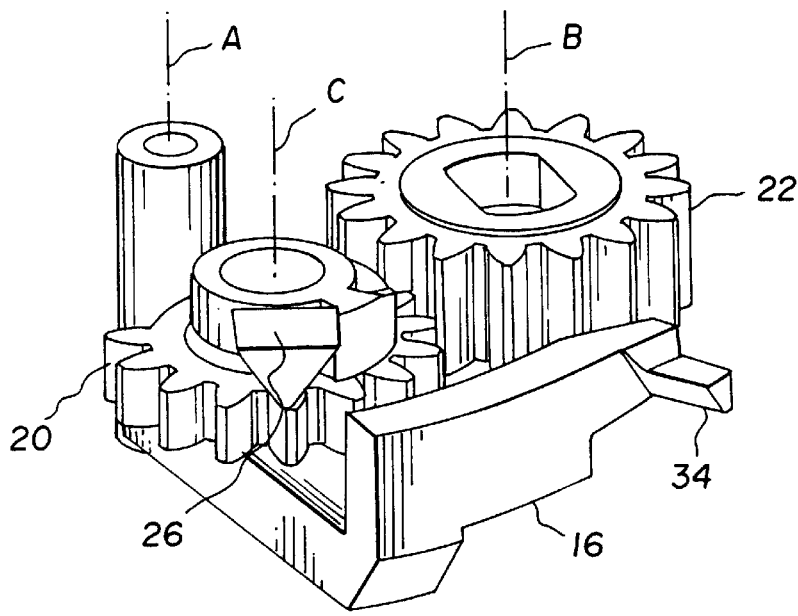
FIGS. 3(a) and 3(b) show a perspective view and a top view, respectively, of the lever cocking apparatus illustrated in FIG. 2 with the lever in an uncocked position.
Figure 3B:
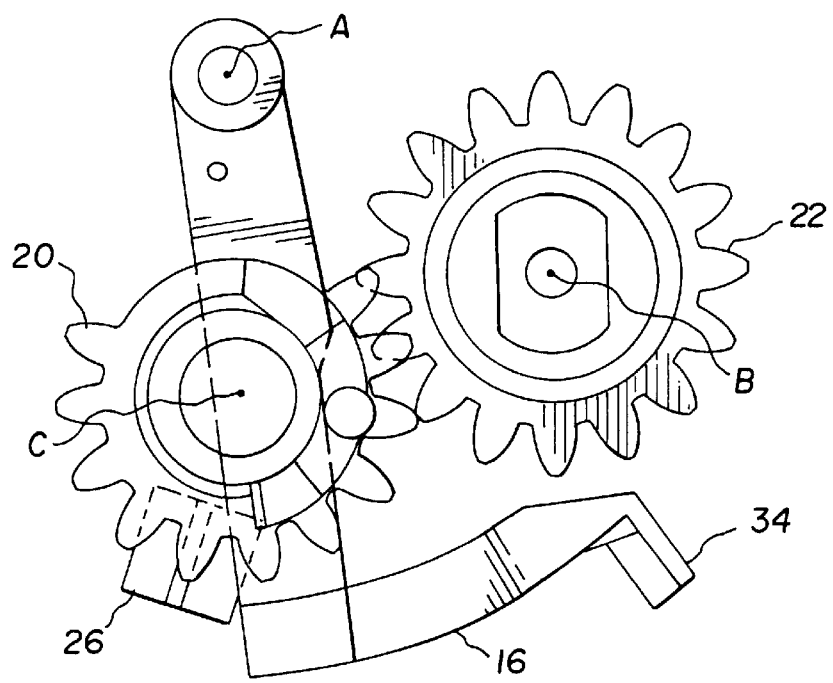
Figure 4A:
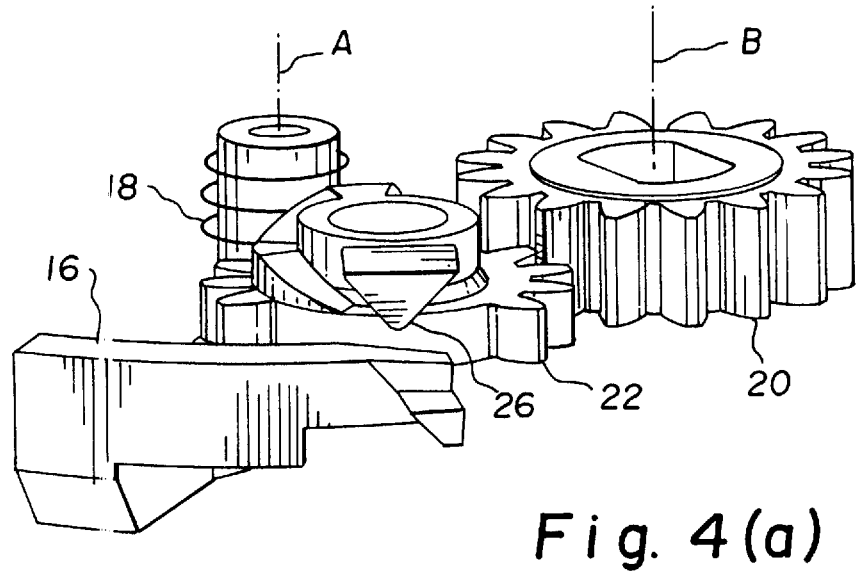
FIGS. 4(a) and 4(b) show a perspective view and a top view, respectively, of the lever cocking apparatus illustrated in FIG. 2 with the lever in a cocked position.
Figure 4B:
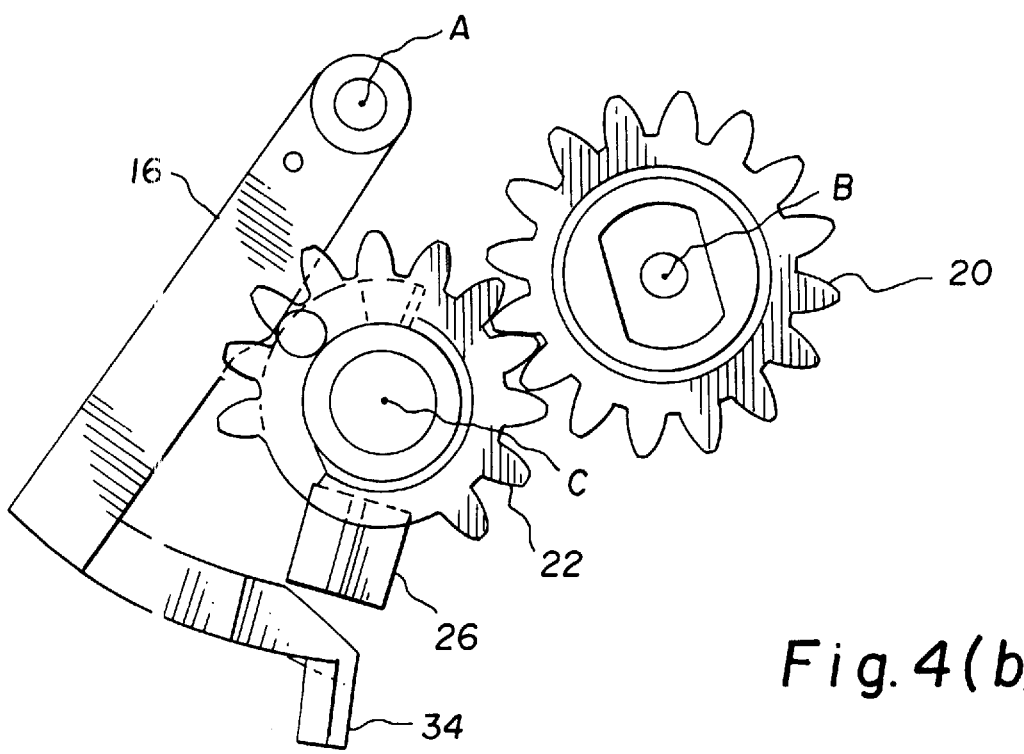

Initially, lever 16 is in an uncocked position, as illustrated in FIGS. 3(a) and 3(b), wherein lever 16 is biased toward driven gear 22 by first resilient member 18. In the uncocked position, second resilient member 28 biases driven gear 22 in the first position such that drive gear 20 and driven gear 22 define a plane and tooth portion meshes with the gear teeth of drive gear 20. Contact surface 38 of driven gear 22 abuts lever 16 along cocking surface 32, urging a leading segment L of tooth portion into meshment with the gear teeth of the drive gear 20. In this uncocked position, cam follower 26 is disposed at a first end of first segment $C_1$ of the cam surface defining a dwell.

In operation, drive gear 20 rotates clockwise, as shown in FIG. 2 by arrow D. As drive gear 20 rotates clockwise, driven gear 22 is rotated counterclockwise (shown by arrow E) as the tooth portion meshes with the gear teeth of drive gear 20.

The rotation of driven gear 22 moves contact surface 38 relative to lever 16. Contact surface 38 rotates about axis C, whereby contact surface 38 slides along cocking surface 32 and overcomes the biasing of first resilient member 18 to move lever 16. When contact surface 38 has moved lever 16 to its furthest travel away from driven gear 22, a latch (not shown) retains lever 16 in this furthest position, referred to as the cocked position. The latch may engage latched surface 30 of lever 16 to retain lever 16 in the cocked position.

Simultaneous to the movement of lever 16, the rotation of driven gear 22 moves cam 24 relative to stationarily mounted cam follower 26. Consequently, as contact surface 38 moves lever 16, cam follower 26 moves along first segment $C_1$ from its first end to its second end. When lever 16 is positioned in the cocked position, cam follower 26 is positioned at the second end of first segment $C_1$. The cocked position is shown in FIGS. 4(a) and 4(b).

Figure 7:
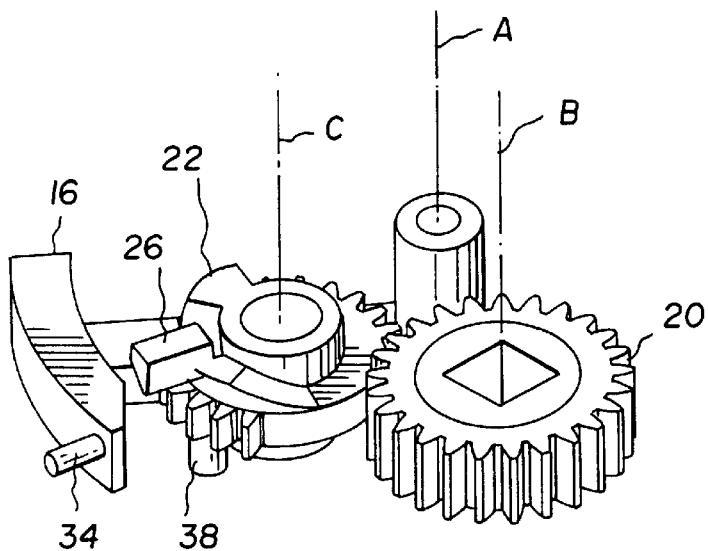
FIG. 7 shows a perspective view of the lever cocking apparatus illustrated in FIG. 2 with the lever in a ready position.
Figure 8:
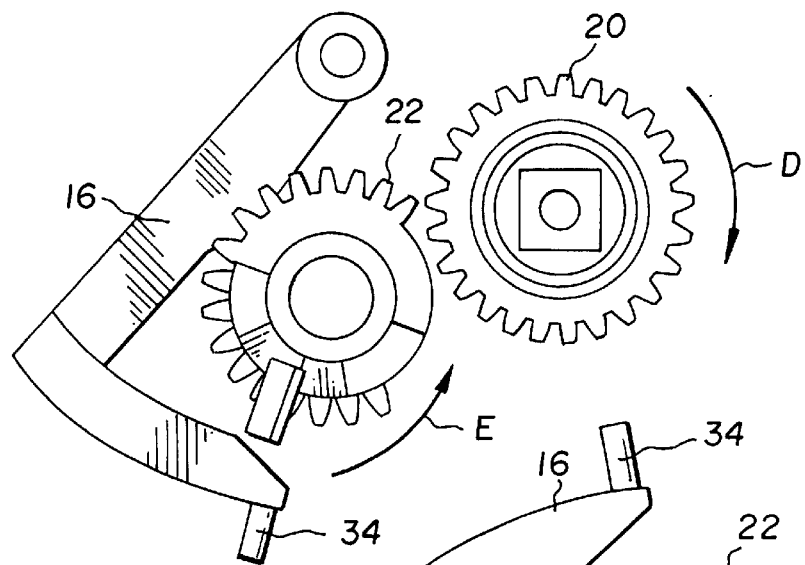
FIG. 8 shows a top view of the lever cocking apparatus illustrated in FIG. 7 with the lever in the ready position.
Figure 9:
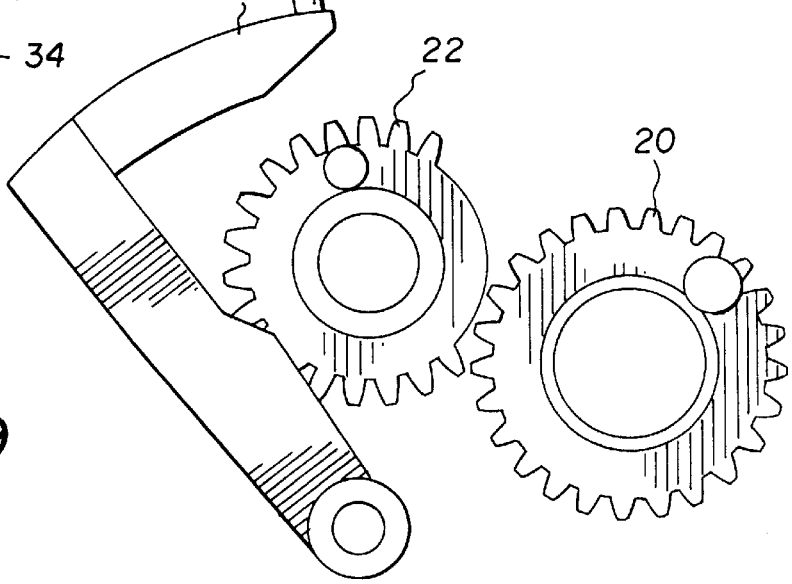
FIG. 9 shows a bottom view of the lever cocking apparatus illustrated in FIG. 7 with the lever in the ready position.

With lever 16 in the cocked position, drive gear 20 continues to mesh with the tooth portion of driven gear 22. As drive gear 20 continues to move driven gear 22, cam follower 26 contacts second segment $C_2$ defining a ramp, and moves therealong. The movement of cam follower 26 along second segment $C_2$ translates driven gear 22 along axis C in a direction shown by arrow F in FIG. 6. As driven gear 22 continues to move, cam follower 26 contacts third segment $C_3$ defining a detent disposed in a dwell surface to retain cam follower 26 at the third segment. Simultaneous with the positioning of cam follower 26 at third segment $C_3$, the tooth portion completes its meshment with the gear teeth. As such, driven gear 22 and drive gear 20 are spaced from each other, with the non-tooth portion being adjacent the gear teeth, as illustrated in FIGS. 7 though 11. Consequently, further rotation of drive gear 20 does not cause movement of driven gear 22; drive gear 20 is able to rotate freely. This orientation, as illustrated in FIGS. 7–11, will hereinafter be referred to as the ready position.

In the ready position illustrated in FIGS. 7 through 11, lever 16 is in the cocked position, driven gear 22 is spaced from drive gear 20 permitting drive gear 20 to rotate freely, and cam follower 26 is disposed at third segment $C_3$. To activate lever 16, shutter 12 is depressed which in turn releases latch (not shown) from latch surface 30 of lever 16. On release, the biasing of first resilient member 18 urges lever 16 toward driven gear 22 to the uncocked position. During urging, activation surface 32 of lever 16 contacts a shutter mechanism (not shown), causing the activation of the shutter mechanism to permit exposure of a film frame.

As lever 16 is urged toward driven gear 22 upon release by the latch (not shown), cocking surface 32 abuts contact surface 38 and causes driven gear 22 to rotate counterclockwise about axis C. With the rotation of driven gear 22, cam follower 26 moves along fourth segment $C_4$ of the cam surface defining a ramp. The movement of cam follower 26 along fourth segment $C_4$ further translates driven gear 22 along axis C in the direction of arrow F, further spacing driven gear 22 from the gear teeth of drive gear 20. Further rotation is effected by cocking surface 32 abutting contact surface 38, and cam follower 26 moves along fifth segment $C_5$ defining a dwell, further spacing driven gear 22 from the gear teeth as the driven gear 22 is rotated.

When cam follower 26 leaves fifth segment $C_5$, cam follower 26 contacts first segment $C_1$. The sharp transition between fifth segment $C_5$ and first segment $C_1$ provides for the instantaneous translation of driven gear 22 in a direction opposite arrow F, permitting the meshing of the gear teeth with leading segment L of the tooth portion.

An advantageous effect of the present invention is that driven gear 22 completes exclusively one revolution to cycle lever 16 from the rest position to the cocked position, and back to the rest position. As such, driven gear 22 rotates solely one revolution during the advancement of one frame of a filmstrip in a camera. Therefore, the operation of lever 16 is independent of the amount of rotation required of a film spool to advance the filmstrip by one frame. That is, since more rotation of the film spool is required as more frames of the filmstrip are exposed, the lever cocking apparatus of the present invention is independent on the length of film which has been advanced in the camera.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An apparatus for cocking a lever, comprising:
   a first gear rotatable about a first axis and having gear teeth;
   a second gear rotatable about a second axis substantially parallel to the first axis and having a contact surface for cooperation with a lever, the second gear having a toothed portion and a non-toothed portion, the second gear biased in a first position wherein the toothed portion is meshable with the gear teeth of the first gear, the second gear including a cam surface adapted to translate the second gear along the second axis to a second position wherein the second gear is spaced from the first gear; and a resilient member biasing the second gear in the first position.

2. A cocking apparatus, comprising:

a lever pivotable about a first axis between a cocked position and a rest position;

a first resilient member biasing the lever in the rest position;

a drive gear rotatable about a second axis;

a driven gear rotatable about a third axis substantially parallel to the second axis and having a contact surface for cooperation with the lever, the driven gear biased in a first position wherein the drive gear and driven gear define a plane, the driven gear having a tooth portion adapted to mesh with gear teeth of the drive gear when the drive gear and driven gear define the plane, the driven gear having a cam surface adapted to translate the driven gear along the third axis to a second position wherein the driven gear is spaced from the drive gear and the drive and driven gears do not define the plane; and a second resilient member biasing the driven gear in the first position.

3. The cocking apparatus according to claim 2 wherein the driven gear includes a non-tooth portion whereby rotation of the drive gear does not effect rotation of the driven gear or pivoting of the lever.

4. The cocking apparatus according to claim 2 wherein the gear teeth of the drive gear are spaced from the tooth portion and adjacent the non-tooth portion when the lever is in the cocked position, such that the drive gear is freely rotatable.

5. The cocking apparatus according to claim 2 wherein meshing of the tooth portion with the gear teeth of the drive gear effects pivoting of the lever about the first axis from the rest position to the cocked position.

6. The cocking apparatus according to claim 2 wherein the lever pivots from the rest position to the cocked position when the tooth portion meshes with the gear teeth.

7. The cocking apparatus according to claim 2 wherein the contact surface cooperates with the lever to pivot the lever about the first axis as the driven gear rotates.

8. The cocking apparatus according to claim 2 wherein the pivoting of the lever from the cocked position to the rest position effects rotation of the driven gear about the third axis.

9. The cocking apparatus according to claim 8 wherein the pivoting of the lever from the cocked position to the rest position does not effect rotation of the drive gear about the second axis.

10. The cocking apparatus according to claim 2 wherein the driven gear translates along the third axis when the lever pivots from the cocked position to the rest position.

11. The cocking apparatus according to claim 2 wherein the gear teeth of the drive gear are spaced from the tooth portion when the lever is in the cocked position, such that the drive gear is freely rotatable.

12. The cocking apparatus according to claim 11 wherein the driven gear includes a non-tooth portion, and the gear teeth are adjacent the non-tooth portion when the drive gear is freely rotatable.

13. The camera cocking apparatus to claim 2 wherein the driven gear completes solely one revolution to cycle the lever.

14. A cocking apparatus, comprising:

a lever pivotable about a first axis between a cocked position and a rest position;

a first resilient member biasing the lever in the rest position;

a drive gear rotatable about a second axis;

a driven gear rotatable about a third axis substantially parallel to the second axis and having a contact surface for cooperation with the lever, the driven gear biased in a first position wherein the drive gear and driven gear define a plane, the driven gear having a tooth portion meshable with gear teeth of the drive gear when the drive gear and driven gear define the plane to effect pivoting of the lever from the rest position to the cocked position;

a cam surface disposed on the driven gear adapted to translate the driven gear along the third axis to space the driven gear from the drive gear; and a resilient member biasing, the driven gear in the first position.

15. A camera comprising:

(a) a filmstrip having at least one frame; and (b) cocking apparatus including:

(i) a lever pivotable about a first axis between a cocked position and a rest position;

(ii) a first resilient member biasing the lever in the rest position;

(iii) a drive gear rotatable about a second axis;

(iv) a driven gear rotatable about a third axis substantially parallel to the second axis and having a contact surface for cooperation with the lever, the driven gear biased in a first position wherein the drive gear and driven gear define a plane, the driven gear having a tooth portion adapted to mesh with gear teeth of the drive gear when the drive gear and driven gear define the plane, the driven gear having a cam surface adapted to translate the driven gear along the third axis to a second position wherein the driven gear is spaced from the drive gear and the drive and driven gears do not define the plane, the driven gear completing solely one revolution during an advancement of the at least one frame of the filmstrip in the camera; and (v) a second resilient member biasing the driven gear in the first position.

* * * * *